United States Patent [19]

Westphal

[11] Patent Number: 4,463,973
[45] Date of Patent: Aug. 7, 1984

[54] SEALED HINGE

[75] Inventor: Mark A. Westphal, Pittsburgh, Pa.

[73] Assignee: Lee-Norse Company, Bristol, Va.

[21] Appl. No.: 416,292

[22] Filed: Sep. 9, 1982

[51] Int. Cl.³ .................. F16L 00/00; F16L 55/00; F16L 27/00; A47L 9/24
[52] U.S. Cl. .................................. 285/298; 285/7; 285/24; 285/184; 98/50; 299/12; 299/64
[58] Field of Search ............... 285/283, 7, 302, 184, 285/24, 298, 224; 98/50; 299/12, 64

[56] References Cited

U.S. PATENT DOCUMENTS 689,894 12/1901 Lutz ................................. 285/184
3,362,086 1/1968 McLean ....................... 285/302 X
4,380,353 4/1983 Campbell et al. .................. 299/64

Primary Examiner—Richard J. Scanlan, Jr.
Attorney, Agent, or Firm—R. J. Falkowski

[57] ABSTRACT

An air duct system for use with mining machines in dust collection systems is connectable between a suction source and the cutting area of a mining machine and has two duct sections movable relative to each other. One duct section is mounted on the cutter boom of the mining machine and has an extendable upper wall, connected through a hinged plate, that abuts a wall of the first duct section which is mounted on the mining machine body. A lower hinged plate connected to the bottom wall of the duct swivels freely and rests on the bottom wall of the first duct to enclose the space between the two duct sections.

4 Claims, 4 Drawing Figures

SEALED HINGE

This invention relates to duct assemblies for dust control systems used with mining equipment, particularly to duct assemblies connected between movable mining machines and stationary dust collection devices.

During the operation of mining machines, such as continuous coal miners, a significant amount of dust is created. Dust collection systems are often used to control the ambient dust levels. Such systems typically have duct assemblies connected between the miner and a suction system to thereby collect the dust as it is created and carry it out of the mining area. In order to do this the duct assembly must be connected between a stationary suction source and a moveable miner. Therefore, the duct assembly must provide for limited movement while maintaining the air integrity of the duct assembly.

With this invention a duct system is provided that is connectable between a movable mining machine and a stationary suction source and is flexible enough for most applications and simple in construction.

The object and advantages of this invention will be apparent from the following description.

Figure 2:
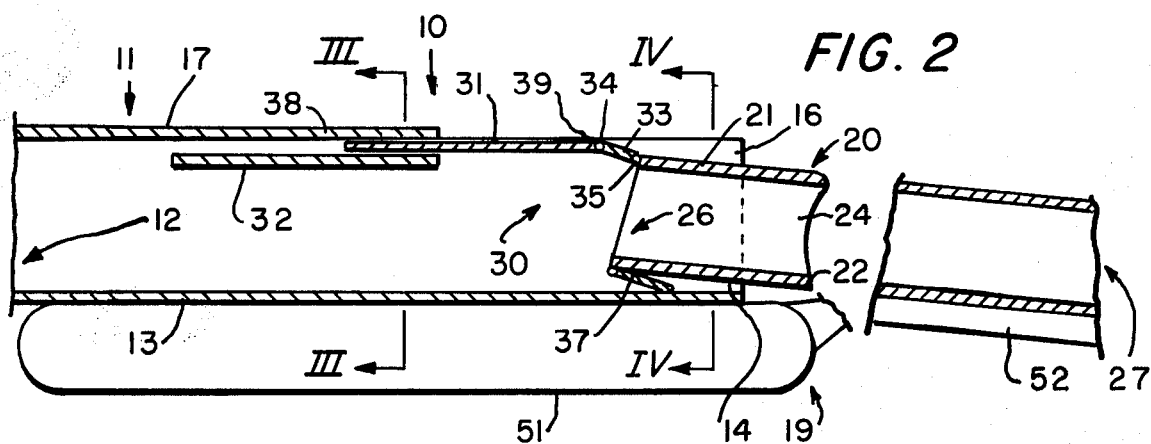
FIG. 2 is a partial cross-sectional view of a duct assembly according to this invention mounted on a miner.
Figure 3:
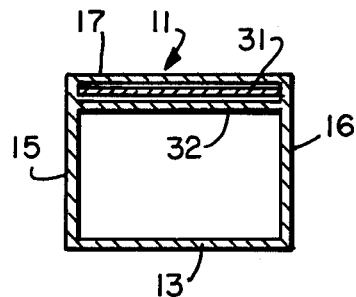
FIG. 3 is a cross-sectional end view of the duct assembly shown in FIG. 2 taken along lines III—III.

Referring to FIG. 2, a duct assembly 10 is connected to and mounted on a miner 19 and comprises a first rectangular elongated duct section 11, a second rectangular elongated duct section 20, and an interconnecting assembly 30. Miner 19 comprises a main body section 51 and a cutter boom 52 connected to main body section 51 in any manner known in the art (not shown) to be moveable and to pivot relative to the main body section. First duct section 11 is connected to and mounted on main body section 51 and second duct section 20 is connected to and mounted on cutter boom 52 in a known manner.

Referring to FIGS. 1, 2, 3 and 4, first duct section 11 is connected at an end 12 to a dust collection system (not shown) in any manner known in the art. Duct section 11 comprises a bottom wall 13, a first side wall 15, a second side wall 16 all extending outwardly to a second end 14 of duct section 11, and a top wall 17 extending towards but terminating at a selected distance from second end 14.

Figure 1:
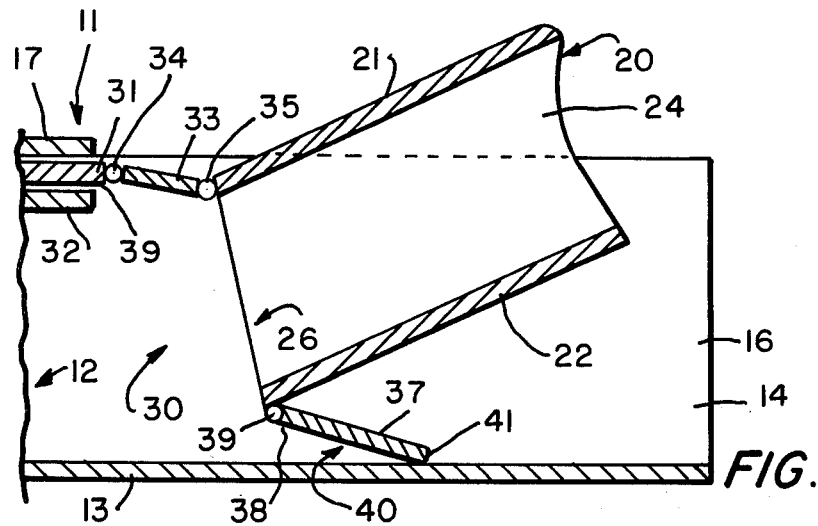
FIG. 1 is a cross-sectional side view of a portion of a duct assembly according to this invention.
Figure 4:
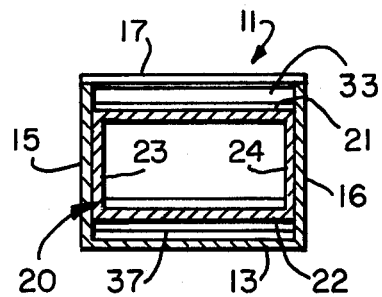
FIG. 4 is a cross-sectional end view of the duct assembly shown in FIG. 2 taken along lines IV—IV.

Referring to FIGS. 1, 2 and 4, second duct section 20 comprises a top wall 21, a bottom wall 22, and a first side wall 23 and a second side wall 24, all extending between a first end 26 and a second end 27 that extends out over the cutting area to provide a suction area in any manner known in the art. The second duct section is relatively moveable within the first duct section and the two side walls respectively abut the first duct section side walls in a sliding arrangement with side wall 23 abutting side wall 15 of the first duct section and side wall 24 abutting side wall 16 of the first duct section. Second duct section side walls 23 and 24 have a width that is selected to be less than the width of first duct section side walls 15 and 16 so that side walls 23 and 24 do not extend beyond side walls 15 and 16.

Referring to FIGS. 1, 2, 3 and 4, interconnecting assembly 30 comprises an upper plate 31, a retaining wall 32, a connecting plate 33, and a bottom plate 37.

Upper plate 31 is mounted to abut and slide with respect to first section top wall 17 and extends between side walls 15 and 16 of the first duct section. Upper plate 31 is supported in position by retaining wall 32 extending between side walls 15 and 16 of the first duct section which is positioned to substantially enclose upper plate 31 in the space formed between top wall 17 and retaining wall 32.

Upper plate 31 has a first end 18 extending inwardly within the first duct section between top wall 17 and retaining wall 32 and a second end 39 extending outwardly from the first section top wall. Connecting plate 33 extends between and abuts first duct section side walls 15 and 16 and has a first end connected at a hinge connection 34 to second end 39 of upper plate 31 and a second end connected at a hinge connection 35 to second duct section top wall 21 at first end 26 of the second duct section.

Bottom plate 37 extends between and abuts side walls 15 and 16 of the first duct section and has a first end 38 connected to bottom wall 22 at first end 26 of the second duct section by a hinge connection 42 and a second end 41 that rests upon bottom wall 13 of the first duct section. The length of bottom plate 37 between first end 38 and second end 41 is selected so that end 41 rests upon bottom wall 13 in all operating positions of the second section with respect to the first duct section. Therefore, in all such operating positions bottom plate 37 is positioned to always form an acute angle, as shown at 40, with first section bottom wall 13.

In the operation of duct assembly 10 as cutter boom 52 moves relatively to main body section 51, second duct section 20 is moved relatively to first duct section 11 and moves inwardly and outwardly of the first duct section and pivotly upwardly and downwardly.

As miner 19 moves inwardly and outwardly and pivotly upwardly and downwardly the air retaining condition of the duct assembly is maintained and bottom plate 37 is always positioned to rest against bottom wall 13.

I claim:

1. A duct assembly for mining machine dust control systems comprising:
    a first duct section having one end adapted to be connected to a dust collection system and another end, having a bottom wall, and having a top wall terminating at a selected distance from said other end;
    a second duct section adapted to be connected to a mining machine and having a top wall and a bottom wall having an end and moveable within the first duct section in a sliding arrangement;
    an upper plate mounted to abut and slide with respect to the first duct section top wall and having an end extending outwardly of said first duct section top wall;
    a connecting means for connecting the upper plate at its end to the second duct section top wall with a movable connection; and
    a bottom plate connected with a moveable connection to the end of the second duct section bottom wall, said bottom plate having a length selected so that it rests against the first duct section bottom wall.

2. A duct assembly according to claim 1 wherein said connecting means comprises a connecting plate connected between the end of the upper plate and the top wall of the second duct section with a hinge connection to said upper plate and a hinge connection to said top wall.

3. A duct assembly according to claim 1 wherein said bottom plate is connected with a hinge connection to the bottom wall of the second duct section and said bottom plate is positioned to form an acute angle with said first duct section bottom wall.

4. A duct assembly for mining machines dust control system comprising:
- a first rectangular elongated rectangular duct section having a bottom wall and two side walls extending between a first end adapted to be connected to a dust collection system and a second end having a top wall terminating at a selected distance before said second end;
- a second rectangular elongated duct section having a top wall, a bottom wall and two side walls extending between a first end adapted to be connected to a mining machine and a second end with said second end positioned at and telescopically movable within the second end of the first duct section and with said second duct section side walls in a telescopically sliding arrangement, said second duct section side walls having a width selected to be less than the width of said first duct section side walls;
- a retaining wall mounted within the first duct section below and parallel to the top wall of the first duct section at a selected spacing;
- an upper plate having an end mounted between the retaining wall and the first duct section top wall to abut and slide with respect to the first section top wall, and extending outwardly of said first duct section top wall but not beyond the second end of said first duct section;
- a connecting plate extending between the first duct section side walls and having a first end and a second end with said first end having a hinge connection to the end of the upper plate and said second end having a hinge connection to the top wall at the second end of the second duct section; and
- a bottom plate extending between the first duct section side walls and having a first end and a second end with said bottom plate first end having a hinge connection to the bottom wall of the second duct section of the second end of the second duct section, said bottom plate having a length selected so that it rests upon the first duct section bottom wall and so that in all operation positions of the second duct section with respect to the first duct section said bottom plate is positioned to form an acute angle between said first duct section bottom wall and said bottom plate.

* * * * *